(No Model.)

C. W. HAIGHT.
CAN OPENER.

No. 594,079. Patented Nov. 23. 1897.

WITNESSES
John Buckler,
C. Gersh

INVENTOR
Charles W. Haight
BY
Edgar Tate & Co.
ATTORNEYS.

UNITED STATES PATENT OFFICE.

CHARLES W. HAIGHT, OF MOUNT VERNON, NEW YORK.

CAN-OPENER.

SPECIFICATION forming part of Letters Patent No. 594,079, dated November 23, 1897.

Application filed July 2, 1897. Serial No. 643,287. (No model.)

*To all whom it may concern:*

Be it known that I, CHARLES W. HAIGHT, a citizen of the United States, residing at Mount Vernon, in the county of Westchester and State of New York, have invented certain new and useful Improvements in Can-Openers, of which the following is a full and complete specification, such as will enable those skilled in the art to which it appertains to make and use the same.

This invention relates to can-openers; and the object thereof is to provide an improved device of this class which is simple in construction and operation and also comparatively inexpensive.

The invention is disclosed in the following specification, of which the accompanying drawings form a part, in which—

Figure 1:
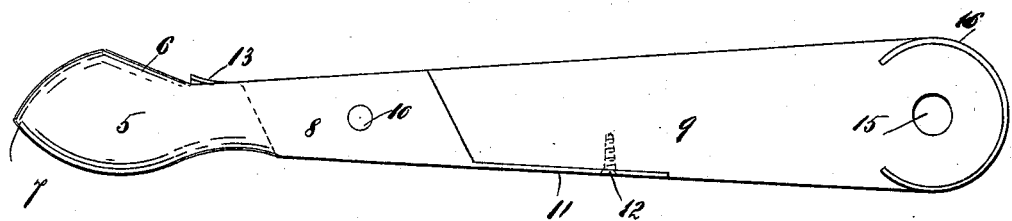
Figure 2:
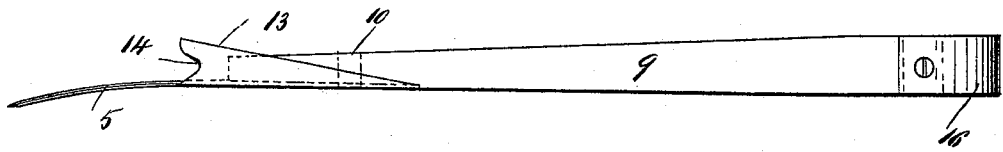

Figure 1 is a side view of my improved can-opener, and Fig. 2 a plan view thereof.

In the drawings forming part of this specification the separate parts of my improvement are designated by the same numerals of reference in each of the views, and in the practice of my invention I provide a can-opener which consists of a blade 5, which is substantially elliptical in outline and curved laterally or segmental in form, and the rear part of the upper edge thereof is cut away at an angle, as shown at 6, the angular or straight portion 6 being provided with a cutting edge and said blade being also provided with a point 7, and the convex or circular portions adjacent to said point are also preferably provided with cutting edges, and said blade is provided with a shank 8, which is secured to the end of a handle 9 at one side thereof by a pin 10, and the shank 8 is provided at one side thereof with a backwardly-directed extension 11, which is secured to one edge of the handle by a screw or screws 12, and said shank is also provided with a forwardly-directed lateral extension 13, which is triangular in form and the wider end of which terminates adjacent to the blade 5 and is provided with a notch or recess 14.

The handle 9 is of the form shown in Figs. 1 and 2, and the end thereof opposite the blade 5 is provided with an opening 15, by which it may be suspended from a suitable support, and said end of the handle is also reinforced or strengthened by a metal plate 16. The lateral extension 13 of the shank is on the convex side of the cutting-blade 5, and the operation of the device will be readily understood from the foregoing description, when taken in connection with the accompanying drawings and the following statement thereof.

In practice the point of the blade is forced through the head of a can adjacent to the perimeter thereof, and the end of the lateral projection 13 of the shank 8 rests on the rim of the can, and said rim enters the notch or recess 14, and the said lateral projection 13 constitutes a fulcrum, and the handle of the can-opener is operated as a lever, being raised and lowered at the same time the blade 5 is pushed forwardly, and the cutting edge of the part 6 of the blade serves to cut out the head of the can, as will be readily understood.

This device is simple in construction and operation and perfectly adapted to accomplish the result for which it is intended, and it will be apparent that changes in and modifications of the construction described may be made without departing from the spirit of my invention or sacrificing its advantages.

Having fully described my invention, I claim as new and desire to secure by Letters Patent—

1. A can-opener comprising a handle 9, a blade 5, which is provided with a shank 8, said shank being secured to one side of the end of the handle, and being provided at one side thereof with a backwardly-directed extension which is secured to one edge of the handle, and at the opposite side with a forwardly-directed lateral extension which is adapted to rest on the rim of a can, substantially as shown and described.

2. A can-opener comprising a handle 9, a blade 5, which is provided with a shank 8, said shank being secured to one side of the end of the handle, and being provided at one side thereof with a backwardly-directed extension which is secured to one edge of the handle, and at the opposite side with a forwardly-directed lateral extension which is adapted to rest on the rim of a can, said last-named extension being provided at its outer end with a notch or recess, substantially as shown and described.

3. A can-opener comprising a handle 9, a blade 5, which is provided with a shank 8, said shank being secured to one side of the end of the handle, and being provided at one side thereof with a backwardly-directed extension which is secured to one edge of the handle, and at the opposite side with a forwardly-directed lateral extension which is adapted to rest on the rim of a can, said last-named extension being provided at its outer end with a notch or recess, and said blade being substantially elliptical in outline and laterally curved, substantially as shown and described.

In testimony that I claim the foregoing as my invention I have signed my name, in presence of the subscribing witnesses, this 29th day of June, 1897.

CHARLES W. HAIGHT.

Witnesses:
ALBERT F. GESCHEIDT, Jr.,
EDWIN W. PATTISON.